Sept. 4, 1962     M. WUPPERMANN     3,052,410
MEASURING APPARATUS
Filed Aug. 31, 1956     6 Sheets-Sheet 1

Inventor:
Max Wuppermann
BY: Michael J. Striker
Agt.

M. WUPPERMANN 3,052,410

MEASURING APPARATUS

Filed Aug. 31, 1956

Inventor:
Max Wuppermann
BY: Michael S. Striker
Agt.

Sept. 4, 1962                M. WUPPERMANN                3,052,410
                            MEASURING APPARATUS
Filed Aug. 31, 1956                                  6 Sheets-Sheet 4

Inventor:
Max Wuppermann
BY: Michael S. Striker
         Agt.

Inventor:
Max Wuppermann
BY: Michael S. Striker
Agt.

Sept. 4, 1962 M. WUPPERMANN 3,052,410
MEASURING APPARATUS
Filed Aug. 31, 1956 6 Sheets-Sheet 6

INVENTOR
MAX WUPPERMANN
BY
ATTORNEY

United States Patent Office 3,052,410
Patented Sept. 4, 1962

3,052,410
MEASURING APPARATUS
Max Wuppermann, Wuppertal-Elberfeld, Germany
(Isenburg, Wepperfurth, near Koln, Germany)
Filed Aug. 31, 1956, Ser. No. 607,521
Claims priority, application Germany Sept. 2, 1955
13 Claims. (Cl. 235—103.5)

The present invention relates to an apparatus for measuring a difference in characteristics between a first and a second rotary member. More particularly, the present invention relates to an apparatus for measuring the difference in rotational speeds or in phase displacements of two different rotary members.

The problem of measuring such characteristics of rotary members such as the rotational speed and/or the phase displacement of different rotary members and the difference of such characteristics between such rotary members occurs many places in industry. This occurs, for example, in apparatus used in the paper industries, the textile industries, the synthetic material industries, in rolling mills, in aircraft machinery, etc.

When the difference in characteristics between the two rotary members to be determined is very small it is possible that the error in measuring such characteristics approaches the actual characteristic difference itself. For example if two rotating shafts have a relative phase displacement of 1° and the method used for measuring the phase displacement of the shaft is only accurate to the order of 1°, it would be impossible to accurately determine the actual phase displacement difference between the two rotating shafts.

Accordingly it is an object of the present invention to overcome the disadvantages of the prior art characteristic measuring devices of rotary members.

A second object of the present invention is to provide a new and improved apparatus for measuring a difference in characteristics between at least a first and a second rotary member.

A further object of the invention is to provide a new and improved device for accurately determining the difference in rotational speed between two rotary members.

Still another object of the present invention is to provide a new and improved apparatus for accurately determining the actual phase displacement between two rotating members.

Still a further object of the present invention is to provide a new and improved differential comparison device for measuring the difference in characteristics between the two rotary members.

With the above objects in view the present invention mainly consists of an apparatus for measuring a difference in characteristics between at least a first and a second rotary member and including a first generator coupled to the first rotary member and providing a first output voltage the frequency of which is proportional to the characteristic of the first rotary member to be measured, a second generator coupled to the second rotary member and providing a second output voltage the frequency of which is proportional to the characteristic of the second rotary member to be measured, a differential comparison device having a rotatable shaft and being responsive to the first and second output voltages for rotating the rotatable shaft with a speed of rotation proportional to any difference between the first and second voltages, and indicating means coupled to the rotatable shaft for indicating the speed of rotation of the rotatable shaft and thereby indicating the difference in characteristics between the first and second rotary members.

In a preferred embodiment of the present invention the first and second generators are alternating current generators and the differential comparison device is a motor having an alternating current type stator with windings connected to externally available input and output terminals. The output voltage of one of the generators is connected to the input terminals of the differential comparison device stator winding and the output voltage of the other of the generators is connected to the output terminals of the differential comparison device stator winding for producing a superimposed voltage wave shape which in turn provides one or more rotary fields within the stator.

In another preferred embodiment of the present invention the motor differential comparison device includes a rotor formed from a plurality of laminations which have projecting pole portions responsive to the rotary field set up in the stator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
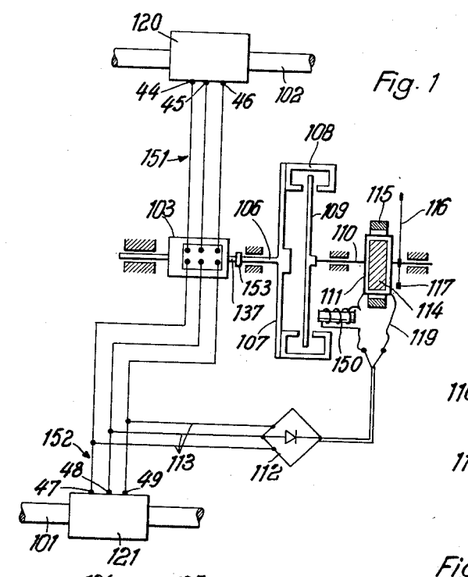
FIG. 1 is an overall electrical schematic diagram showing the various connections between the components of the characteristic measuring system constructed in accordance with the present invention.

Referring now to the drawings and more particularly to FIG. 1, it can be seen that the rotary members whose difference in characteristics are to be determined are the rotatable shafts 101 and 102. The shaft 101 is coupled to alternating current generator 121 and the shaft 102 is coupled to an alternating current generator 120. Therefore, these generators 120 and 121 rotate with the same rotational speed as the rotating shafts 102 and 101 respectively.

The output voltage from the generator 120 is applied on conductors 151 to a first set of terminals of a differential comparison device 103. The output voltage from the generator 121 is applied on conductors 152 to a second set of terminals of the differential comparison device 103.

The frequencies of the output voltages on the conductors 151 and 152 which are applied to the differential comparison device 103 are respectively proportional to the characteristic of shafts 101 and 102 to be determined. That is, if the rotational speed of the shafts are to be determined, the frequency of the output voltage will be proportional to these rotational speeds. Similarly, if a phase angular displacement between the two shafts 101 and 102 is to be determined, the phase shift of the output voltages will be proportional to this phase angular displacement.

The differential comparison device 103 is provided with a shaft 137 (FIG. 3) connected with a rotatable shaft 106 which is rotated by the device 103 at a speed of rotation proportional to the difference between the voltages applied on conductors 151 and 152. The operation and construction of the differential comparison device 103 will be explained hereinbelow in the application.

Figure 3:
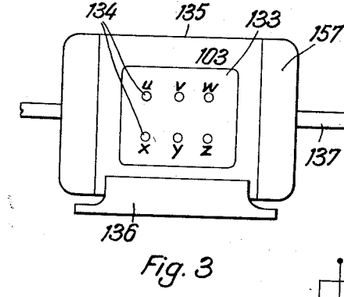
FIG. 3 is an elevational view of a motor differential comparison device constructed in accordance with the present invention.

The rotatable shaft 106 is connected at one end thereof to a disc-shaped holder 107 on which are mounted permanent magnets 108, and at the other end by coupling means 153 to the shaft 137 of the device 103. In place of permanent magnets, it is possible to use electromagnets which have the advantage that the regulation produced by the magnetic field of the electromagnets can be varied to change the force of the coupling to be described.

The magnets 108 establish a magnetic field in which is mounted a disc 109 which can be made of aluminum, for example. Connected to the disc 109 is a rotatably mounted shaft 110 which is connected to a rotary coil 111 which in turn is energized from a rectifier 112 by means of conductors 119. The conductors 119 are arranged and connected so as to provide no force which would apply a torque to the coil 111 in any particular direction.

It can be seen that the input to the rectifier 112 is provided by conductors 113 which are connected to the output conductors 152 of the generator 121.

Figure 17:
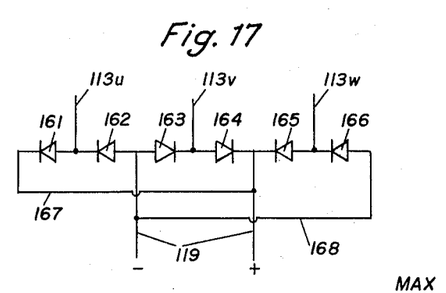
FIG. 17 is a more detailed diagram of the rectifier devices of FIGS. 1 and 11.

As shown in greater detail in FIG. 17, the whole rectifier device is composed of a series of individual half-wave rectifiers 161 to 166 which are connected in series, however, with the pair 163, 164 arranged in opposite direction to the other rectifiers. The three phase lines 113$u$, 113$v$ and 113$w$ are respectively connected between the two rectifiers of each pair thereof. The two D.C. lines 119 are connected to the series of rectifiers at points located between adjacent pairs of rectifiers and are otherwise connected by lines 167 and 168, respectively, to the outer ends of the rectifier series, respectively. It is quite evident that a rectifier of this type is adapted to convert three-phase current into D.C. current. However, it should be understood that there are other known types of rectifiers having the same capabilities and therefore quite as well suitable for use in the arrangement according to this invention. The only factor which matters is that the rectifier arrangement furnishes a D.C. voltage at the input lines 119 of the measuring device, proportional to the amplitude of the three-phase voltage at 113.

Figure 2:
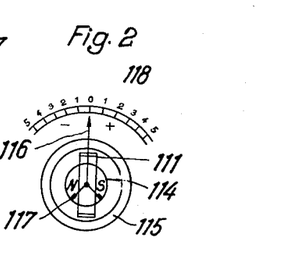
FIG. 2 is a front view of a scale and measuring instrument for indicating the characteristic difference between the two rotary members.

Within the coil 111 is mounted a magnetic core 114 surrounded by an annular ring 115 to provide a path for the return flux. As can be seen in FIGS. 1 and 2, the coil 111 is provided with a pointer 116 and with counterweights 117, which pointer cooperates with a scale 118 indicating percentages.

In the undeflected position, it is clear that the counterweights 117 maintain the pointer 116 in the central position of the scale 118 which in this arrangement is the null-point.

In operation, when the rotatable shaft 106 is rotated by the differential comparison device 103, the magnets 108 are also rotated at the same speed as the shaft 106. Therefore a torque is exerted on the aluminum disc 109 due to eddy current effects. This torque is counter-balanced by the counter-torque exerted on the rotatable coil 111. The torque to which the rotatable coil 111 is subjected depends not only on the direction and magnitude of the current flowing through the coil 111 and the magnetization of the core magnet 114 but also on the turning angle of the rotary coil 111 between the position of the pointer 116 and the nullpoint. As illustrated the arrangement provides a linear response. However, it is clear that this response can be made sinusoidal or any other desired shape in well known manners.

In the illustrated example, the coil 111 is energized by means of a rectifier 112 which is connected to the output of the generator 121. However, a separate direct current tachometer can be used instead of one of the generators 120 and 121. A predetermined difference in rotational speeds between the rotary members 101 and 102 results in a deflection of the pointer 116 depending on the particular response ratio of the measuring instrument. Therefore for low rotational speeds of the shaft 101 large deflections can be achieved and for high rotational speeds small deflections can be achieved.

When the magnet system 108 remains stationary, which indicates that the characteristics of the rotary members 101 and 102 are the same, then any amount of the current through the coil 111 positions the indicator 116 at its null position.

The described arrangement can be changed so that in place of the result indicating the torque exerted, the phase angle can be shown.

The return torque of the indicator can be arranged in other advantageous manners, for example, by electro-dynamic members. In the apparatus illustrated in FIGS. 1 and 2, it is a simple manner to correct the null position of the pointer 116 merely by turning the magnet 114. This is advantageous not only for scale correction purposes but for many other purposes. For example, if it is desired to determine the difference in peripheral velocity of the rotary members 101 and 102 which have to be transformed into turns or revolutions per minute, it is possible by properly adjusting the magnet 114 to make such transformation. The driving rollers of the operating machines might have to be replaced if they are worn out by new ones or by tubular members which fit over the shafts in a manner of sleeves. In any event the diameter of the shafts can thereby be changed. Accordingly it is desirable to have such a scale changing feature that is available with the movable core magnet 114.

As is necessary in most indicating and measuring devices it is desirable to have damping of the indicator pointer. Such damping can be arranged by providing one or more fixed electromagnets 150 connected in series with coil 111 which influence or cooperate with the aluminum disc 109 and which are energized by the direct current which energizes the rotary coil 111. In this manner an optimum damping resistance can be achieved.

A further advantage of the system described in FIGS. 1 and 2 is the friction-free arrangement of the system consisting of the rotary coil 111 and the aluminum disc 109.

Another advantage of the described system is that the difference in rotational speeds of the rotary members may be measured without transforming the voltage values regardless of whether the difference in velocity is in a positive or a negative direction. That is, the indicator indicates the relative velocity difference whereby the response of the indicating meter can be calibrated in a very simple manner.

The force produced in FIG. 1 by the core magnet 114 can be produced in other manners whereby the aluminum disc 109 can be used as the driving means as coupled to the magnet 108. In this case the magnet 114 would then be arranged on the driven side of the coupling means.

Figure 4:
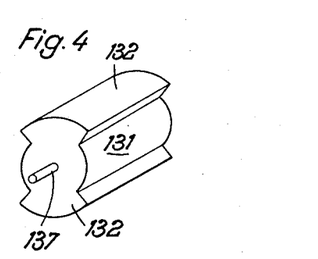
FIG. 4 is a perspective view of a rotor used with the differential comparison device illustrated in FIG. 3.

Referring now to FIGS. 3 and 4, the differential comparison device 103 will be described. As can be seen in FIG. 3 the differential comparison device includes a motor arranged within a housing 135 in which is mounted a stator winding 130. Within the stator winding 130 is arranged the rotor 131 having the rotatable shaft 137.

Figure 15:
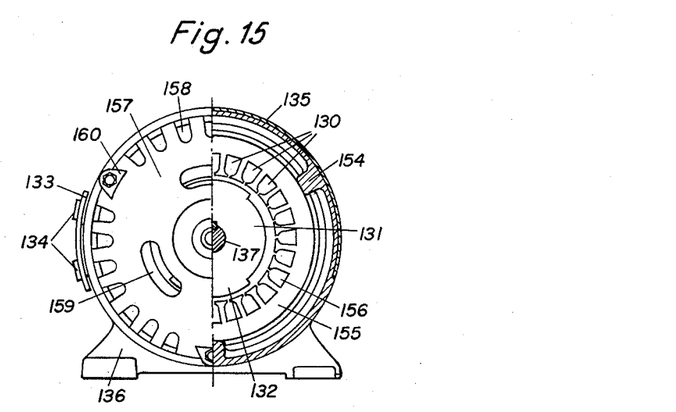
FIG. 15 is a partly sectional end view of the differential comparison device of FIGS. 1-3.
Figure 16:
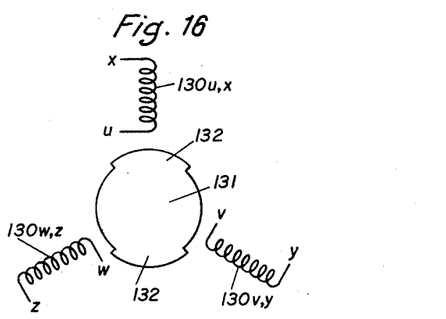
FIG. 16 is a wiring diagram thereof.

FIG. 15 and 16 are a partly sectional end view and a wiring diagram of this device, respectively. As can be seen from FIG. 15, the differential comparison device 103 is essentially built like a conventional synchronous three-phase motor, with the only difference that the rotor is modified and the connection of the stator windings is different. The stator comprises a housing 135 having ribs 154. The ribs 154 support the lamination stack 155 which is composed of sheet metal laminations insulated from each other in conventional manner. The stack 155 has grooves 156 accommodating the winding 130. This winding can be provided in any suitable way as a three-phase winding and it is quite immaterial which one of the many known types of winding arrangements is used. It is only important that the winding 130 is adapted to produce a rotary field when a suitable three-phase voltage is applied to its terminals. The rotor 131 supported by shaft 137 for rotation is accommodated within the cylindrical spaced left inside the stator stack 155.

As best seen in FIG. 4, the rotor 131 is provided with projecting pole portions 132 which cooperate with the rotary field set up in the stator winding 130 (not shown in FIG. 3). The housing 135 is mounted on a stand 136.

As can be seen from FIGS. 3 and 15, the front portion 157 of the housing 135 is provided with ventilation openings 158 and 159. The portion 157 is connected to the housing 135 by suitable lugs and bolts 160. The terminal board 133 with terminals 134 is mounted on one side of the housing 135.

FIG. 16 shows diagrammatically the arrangement of the stator winding 130. As has been mentioned, the stator winding 130 is a three-phase winding composed of sections $130_{u,x}$, $130_{v,y}$ and $130_{w,z}$. The ends $u$, $v$, $w$ of the three winding sections are connected to the three terminals $u$, $v$, $w$ shown in FIG. 3, and similarly the ends $x$, $y$, $z$ are connected with the terminals $x$, $y$, $z$ of FIG. 3. As has been mentioned, the winding system is an "open" one which means that the individual winding sections are not connected with each other in any way, not even in the manner of a conventional star or delta system.

In FIG. 3 it can be seen that the device 103 is provided with a terminal board 133 on which is located two sets of terminals namely $u$, $v$ and $w$, and $x$, $y$ and $z$. The terminals $u$, $v$ and $w$ correspond to input terminals for the winding of the stator 130 and the terminals $x$, $y$ and $z$ correspond to output terminals from the stator winding 130.

The terminal board 133 is made of insulating material so that the various terminals are not connected and the stator winding 130 is in "open" condition. Also, the poles 132 of the rotor 131 are made of a plurality of laminations which are insulated from one another.

Measurable moments of inertia do not occur at low speeds of revolution since the inertial energy decreases with the square of the speed of revolution. Therefore at 30 revolutions per minute, the inertial energy is 1/10,000 of the inertial energy at speeds of revolution of 3,000 revolutions per minute. Therefore by use of the apparatus it is possible to determine the proper moment when both of the rotary members are running at precisely the same speed and use the apparatus for switching in and coupling such rotary members.

The generators 120 and 121 may be polyphase generators having 2, 3 or more phases to produce the rotary fields in the differential comparison device 103.

In accordance with the present invention the motor 103 operates as a differential comparison device which runs synchronously with the applied polyphase voltages or with the rotary single phase voltages. The motor operates without any slip ring and therefore very little friction or iron losses are introduced. Accordingly, it is possible with such a comparison device to determine the difference in speeds of revolution of very small magnitude. Accordingly, the disadvantages of conventional arrangements are avoided since the motor 103 can follow the frequency of the applied voltages from the lowest values down to zero without introducing any extraneous effects.

Because the stator winding 130 of the motor 103 must be "open," squirrel cage arrangements wherein short circuiting effects are provided must not be used under any circumstances.

Figure 5:
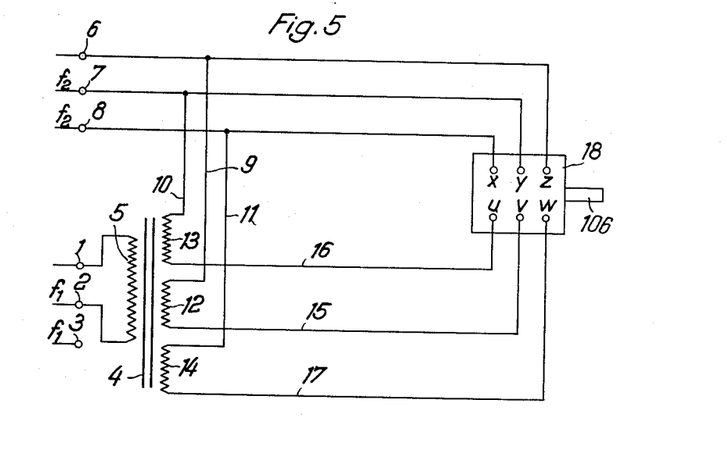
FIG. 5 is an electrical schematic diagram of a second embodiment of the present invention.

Referring now to FIG. 5, another embodiment will be described. In this embodiment the generator (not shown) coupled to one of the rotary members 101 has output terminals 1, 2 and 3. The second generator, coupled to the other rotary member 102 has output terminals 6, 7 and 8. The output of the first generator is arranged as a single phase arrangement wherein terminals 1 and 2 are connected to the primary winding 5 of a transformer 4.

On the other hand, the terminals 6, 7 and 8 are respectively connected by conductors 9, 10 and 11 to secondary windings 12, 13 and 14 of the transformer 4. The terminal board 18 of the stator winding has the two sets of terminals $u$, $v$ and $w$, and $x$, $y$ and $z$ as indicated hereinabove. The terminals $u$, $v$ and $w$ are respectively connected to the secondary windings 13, 12 and 14 by means of conductors 16, 15 and 17. Similarly, the terminals $x$, $y$ and $z$ are respectively connected to the terminals 8, 7 and 6.

Figure 12:
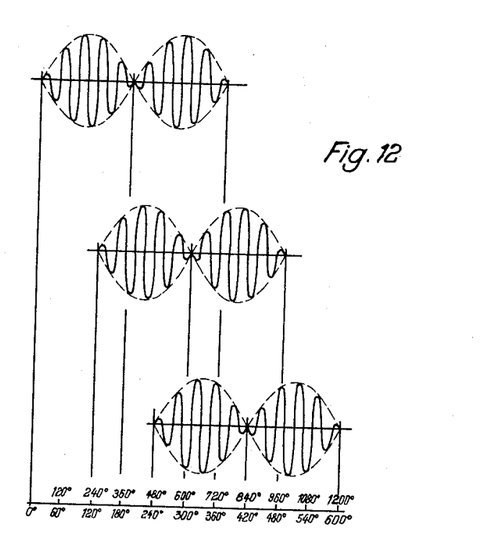
FIGS. 12, 13 and 14 are graphical representations of the voltage patterns in the stator windings of the differential comparison device constructed in accordance with the present invention.

With this circuit arrangement, the single phase alternating voltage having a frequency $f_1$ is superimposed on each single phase of the voltage coming from the second generator and having a frequency $f_2$. At relatively small differences between the rotational speeds of the rotary members 101 and 102, the superimposed voltages have magnitudes which vary between 0 and a voltage which is twice the magnitude of one of the voltages. Such a graphical representation is shown in FIG. 12. The magnitude of the beat frequency is $/f_1-f_2/$. The maximum beats of the three phases are displaced from one another by 120°. Since the voltages which are graphically represented in FIG. 12 are the voltages which are applied to the differential comparison device 103, the shaft 106 thereof rotates with a speed of revolution which corresponds to half of the difference frequency, namely, $$\frac{f_1-f_2}{2}$$

The basis for the above statement is that a rotating alternating field is produced within the stator winding of the differential comparison motor 103 which rotates slowly with the the frequency $$\frac{\omega_1-\omega_2}{2}$$

The generators can be synchronous polyphase generators or else the generators may have rotors using slip rings. If the slip ring rotor generators are used it is immaterial whether direct current or polyphase alternating current is used for exciting the same. It is important however that one of the generators be operated as single phase and the other as polyphase as indicated in FIG. 5.

Figure 6:
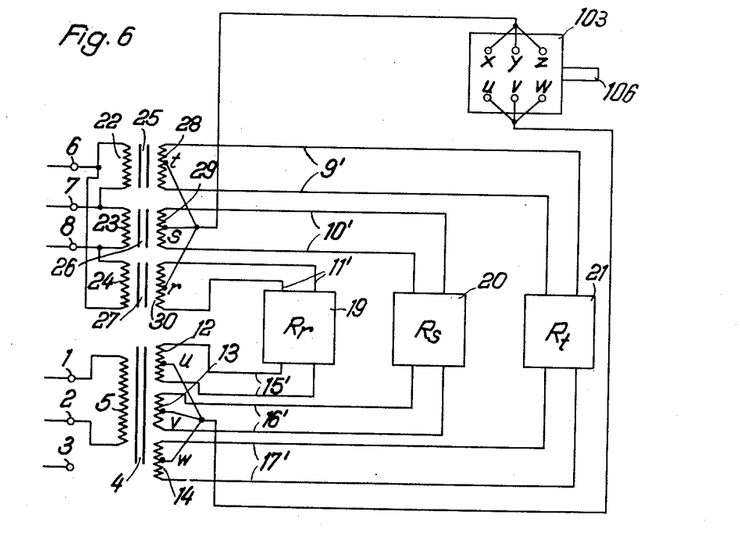
FIG. 6 is an electrical schematic diagram of a third embodiment of the present invention.

Referring now to FIG. 6, another embodiment will be described. On the output terminals 1 and 2 of the first generator which is connected to the first rotor 101 an alternating voltage proportional to the rotational speed of the rotor 101 is applied to the primary winding 5 of the transformer 4. As before, the transformer 4 has three secondary windings 12, 13 and 14.

The three-phase voltages which correspond to the terminals 6, 7 and 8 of the second generator are applied to the three primary windings 22, 23 and 24 of transformers 25, 26 and 27, respectively. The secondary windings 12, 13 and 14 of the first transformer 4 and the secondary windings 28, 29 and 30 of the second transformer groups are applied to three phase sensitive rectifiers 19, 20 and 21 by means of conductors 9', 10', 11', and 15', 16', and 17', respectively.

Figure 7:
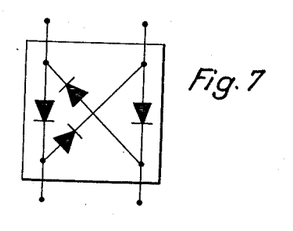
FIG. 7 is a schematic diagram of a phase sensitive rectifier capable of being used in the system of the present invention.

The outputs from the three rectifiers $R_r$, $R_s$ and $R_t$ are applied to the midpoints of windings 12, 13 and 14 of the transformer 4 and the midpoints 28, 29 and 30 of the secondary windings of the transformers 25, 26 and 27, respectively. The midpoints are respectively connected to the terminals $u$, $v$ and $w$ and $x$, $y$ and $z$ of the differential comparison device 103. In FIG. 7 is illustrated an example of one of the phase sensitive rectifiers which are used in the embodiment of FIG. 6, but both transformers may be two-phase, three-phase or multi-phase.

On the output of the three phase sensitive rectifiers 19, 20 and 21, is provided the sum frequencies and the difference frequencies of the applied voltages. The difference frequencies are desired in the present case so that the sum frequencies can be filtered out or made negligible by means of large inductances in the circuit.

Figure 13:
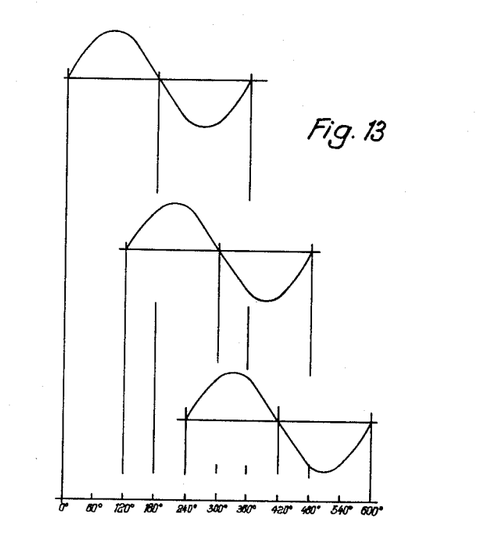

The outputs from the three phase sensitive rectifiers include modulation products which have frequencies which are equal and which are displaced from one another by 120°. If these voltages having low frequencies, as shown in FIG. 13, are applied to the stator winding of the differential comparison device, then a slowly rotating rotary field is induced in the stator winding which rotates in a direction dependent upon whether the frequency $f_1$ is smaller or larger than the frequency $f_2$.

The poles 132 of the rotor 131 of FIG. 4 will turn the rotor synchronously with the rotary fields set up in the stator winding 130. In this manner, the rotatable shaft 137 will rotate synchronously and proportionally to the difference frequencies of the two rotary members 101 and 102.

Figure 8:
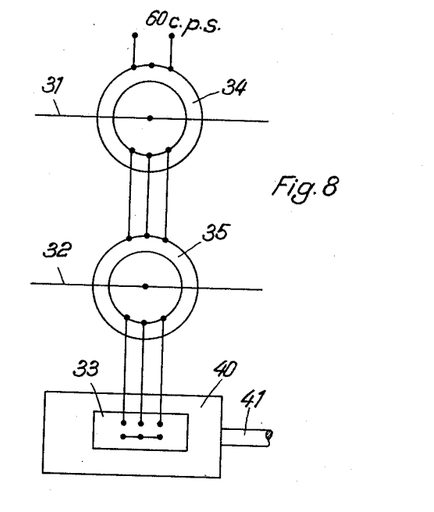
FIG. 8 is a schematic diagram of still another embodiment of the present invention.
Figure 14:
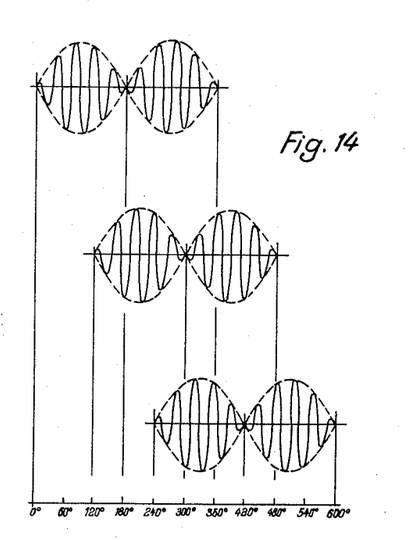

Referring now to FIG. 8, an arrangement is shown whereby the shafts 31 and 32 are provided with slip ring machines 34 and 35. The stator of the machine 34 is energized with a frequency in the order of 50 or 60 cycles per second and the rotor of this machine is connected in three phase relationship with the stator of the machine 35. As indicated in FIG. 14, voltages will be produced in the rotor winding of the machine 35 which will correspond to the graphic representation shown in FIG. 12.

These voltages are applied to the input terminals of a motor 40 which is constructed in accordance with the present invention similar to the arrangement 103. The output terminals of the stator winding of the motor 40 are arranged in Y-connection or star-point connection. The shaft 41 of the motor 40 turns proportionally to the difference in the rotational speeds of the shafts 31 and 32.

The last described arrangement has the advantage that it can be used with measuring proportionally simpler machine arrangements.

If the nullpoints of the generators connected to the rotary members are available, then the principle of the arrangements shown in FIGS. 5–8 can be applied since in many cases this will be simpler. For example, referring to the arrangements of FIGS. 9 and 10.

Figure 9:
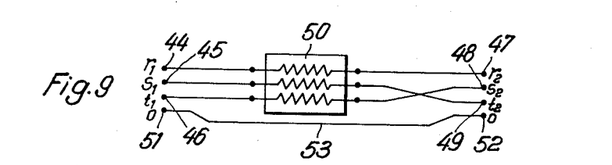
FIG. 9 is an electrical schematic diagram showing advantageous connections made in accordance with one embodiment of the present invention.

As shown in FIG. 9, the terminals 44, 45 and 46 of the first generator are connected with one side of the open stator winding of the motor 50 which is arranged in the manner of motor 103 as a differential comparison device. The terminals 47, 48 and 49 of the second generator are connected to the other side of the stator winding so that the voltages are applied in opposite rotational direction.

The nullpoints of the Y-connections, 51 and 52 are in all cases actually artificial nullpoints so that the conductors 53 can directly connect these nullpoints together. Under certain conditions the nullpoint connections can be done away with.

Due to the combination of the applied rotary fields which rotate in opposite direction in the motor 50, an alternating field is produced which is stationary when the rotary members 101 and 102 run at the same speed and moves, when these members rotate at different speeds at a rotary speed which is proportional to the difference in speed between the two rotary members 101 and 102. Since the speed of turning of the rotary field set up in the motor 50 is proportional to this difference in speed, the rotor of the motor is turned at this synchronous speed.

The voltage proportions of the arrangement shown in FIG. 9 are essentially the same as that shown in FIG. 12 except that the fine structure of the envelope of the beat oscillations is somewhat different.

Figure 10:
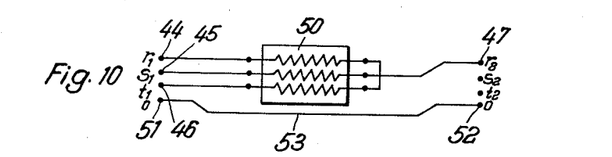
FIG. 10 is an electrical schematic diagram showing connections made in an advantageous manner in accordance with another embodiment of the present invention.

Another possibility is shown in FIG. 10. As in FIG. 9, the terminals 44, 45 and 46 are connected to one side of the open stator winding of the motor 50. The other side of the stator winding is connected in a star connection and is further connected to the terminals of the second generator, such as 47. The star points 51, 52 are connected together by means of the conductor 53. In this manner the voltage proportions are essentially the same as the arrangement shown in FIG. 9. Also here, the envelope of the voltages has the same shape as in the former cases.

By choosing a particular arrangement for a particular driving proportion, depending on the rotary speeds to be measured, it is possible to choose the proper differential comparison device. For example the arrangement of FIG. 5 drives the motor shaft of the differential comparison device with only half the rotational speed as the arrangement shown in FIG. 8. The same is true for the arrangements of FIGS. 9 and 10.

If it is desired, for obvious reasons, to keep the magnetization reversal losses to an absolute minimum, the embodiment illustrated in FIG. 6 is preferred wherein, as shown in FIG. 13, a proportionally slowly changing voltage is provided.

The present invention should not be limited to the described embodiments. For example, the arrangement shown in FIG. 9 in which the input and output terminals of the stator winding are available can be so arranged that in place of the nullpoint connection 53, the output terminals of the first generator which are not connected to the motor 50, can be connected directly to the output terminals of the respective windings of the second generator.

If the nullpoints of both generators are not available, a polyphase secondary transformer can be connected with one of the generators, the transformer having a secondary winding which is open. In this manner one of the ends of the secondary winding of the separating transformer can be connected with one of the ends of the open stator winding of the differential comparison motor, while the other ends of the windings of the transformer and of the differential comparison motor can be connected with the other generator in accordance with the form of a delta connection. In this arrangement, the terminals $u$, $v$, and $w$ and $r$, $s$ and $t$ of the stator winding has applied thereto a voltage which forms oppositely rotating rotary fields.

It goes without saying that two separating transformers can be used to produce a complete potential separation.

Other arrangements can be constructed to provide the relative difference in rotational speeds of the rotary members. For example, in FIG. 11, an arrangement is provided whereby the relative rotational speed difference can be produced in accordance with the compensation principles.

Figure 11:
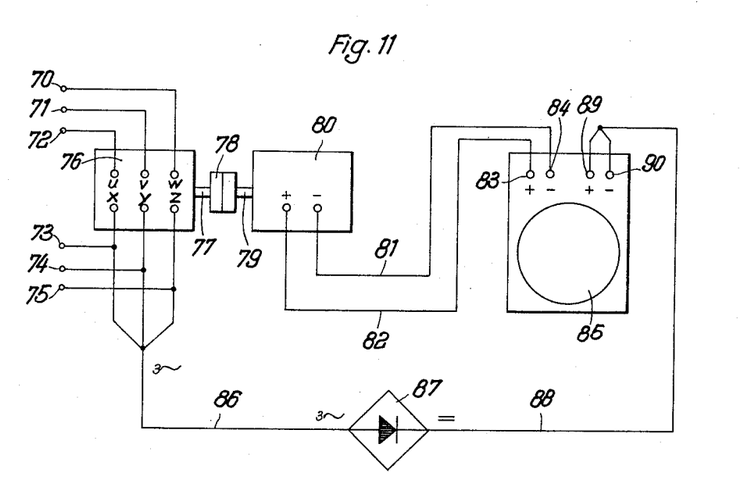
FIG. 11 is an electrical schematic diagram of an arrangement wherein the differential comparison device is used as a quotient former.

As shown in FIG. 11 in accordance with the hereinabove described apparatus the output terminals 70, 71 and 72 of one of the generators and the output terminals 73, 74 and 75 of the other generator are respectively connected to the corresponding stator terminals of the differential comparison motor 76. The driven shaft 77 of the motor 76 is connected through a coupling 78 with a driving shaft 79 of a direct current generator 80. The direct current voltage produced by the generator 80 is applied by means of conductors 81, 82 to the measuring terminals 83 and 84, respectively, of a direct current compensation apparatus 85 which can record, measure or otherwise register such voltage and which can be constructed as a regulating or control apparatus.

In accordance with the conventional arrangements of such type of apparatus, the compensation voltage can be supplied from a standard voltage source, such as a Weston standard cell. According to the present invention a voltage is used for compensation which is proportional to one of the two rotational speeds of the rotary members and which voltage serves as a comparison rotational speed. For this purpose, an alternating single phase or polyphase voltage is taken from terminals 73, 74 and 75 by means of conductor 86 and are connected to a rectifier 87. In this rectifier, the voltage is rectified and if necessary filtered and is applied in the form of a direct current voltage to conductors 88 to the compensation apparatus terminals 89 and 90 of the apparatus 85.

The apparatus 85 is constructed to form the quotient of the determined difference of the rotational speeds of the rotary members and a comparison rotational speed.

One use of the present invention is to measure the phase displacement between two polyphase voltages. For example, if it is desired to synchronize two independent multi-phase voltage systems, this arrangement can be used. In this manner, the multi-phase voltages of the two systems are connected to the differential comparison motor as described hereinabove wherein the rotational speed of the rotary members were compared.

It will be understood that each of the elements described above, or two or more together, may also find a useful application in other types of measuring apparatus differing from the types described above.

While the invention has been illustrated and described as embodied in apparatus for measuring the difference in characteristics between a first and a second rotary member, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for measuring a difference in characteristics between at least a first and a second rotary member comprising, in combination, a first multi-phase alternating current generator coupled to said first rotary member and having output terminals providing a first output voltage the frequency of which is proportional to the characteristic of said first rotary member to be measured; a second multi-phase alternating current generator coupled to said second rotary member and having output terminals providing a second output voltage the frequency of which is proportional to the characteristic of said second rotary member to be measured; a differential comparison device comprising a motor having an alternating current type stator with stator windings and externally available input and output terminals respectively connected therewith, the terminals carrying the output voltage of one of said generators being connected to said input terminals, and the terminals carrying the output voltage of the other of said generators being connected to said output terminals thereby providing in said stator windings superimposed voltages for producing rotary fields, said motor including a rotatable shaft capable of being rotated by said rotary fields at a speed of rotation proportional to any difference between the frequencies of said first and second output voltages, respectively; and indicating means coupled to said rotatable shaft for indicating the speed of rotation of said rotatable shaft and thereby indicating the difference in rotational characteristics between said first and second rotary members.

2. Apparatus as claimed in claim 1 wherein said motor of said differential comparison device includes a rotor connected with said shaft and formed as a metallic body composed of a plurality of magnetizable elements arranged adjacent to each other and having projecting pole portions responsive to said rotary field.

3. A differential comparison device comprising, in combination, a housing; an alternating current stator mounted in said housing, said stator including a winding having input and output terminals externally mounted on said housing, said input terminals being adapted to be connected to a first voltage source and said output terminals being adapted to be connected to a second voltage source for comparison of the voltage thereof with that of said first voltage source, whereby said stator winding when so connected is responsive to said voltages superimposed on each other and produces a rotary field rotating at a speed proportional to the difference between the frequencies of said voltages, respectively; and a rotor rotatably mounted in said housing and responsive to said rotary field and adapted to be rotated by the same at a speed proportional thereto.

4. Apparatus as claimed in claim 3 wherein said rotor is formed as a metallic body composed of a plurality of magnetizable elements arranged adjacent to each other and having projecting pole portions responsive to said rotary field.

5. Apparatus as claimed in claim 1 wherein said output voltages are generated at frequencies respectively proportional to the characteristics to be measured of said first and second rotary members; a phase-sensitive rectifier means connected in circuit between the outputs of said generators and said differential comparison device, said phase-sensitive rectifier means having input terminals respectively connected to the output terminals of said generators thereby providing at the output of said rectifier a slowly changing alternating current voltage which is applied to said differential comparison device.

6. Apparatus as claimed in claim 1 wherein said output voltages are applied to said differential comparison device in such manner that said output voltages produce oppositely rotating rotary fields in said motor.

7. Apparatus as claimed in claim 1 wherein said alternating current generators are polyphase generators having windings connected in Y-connections and wherein the null point of each of said respective Y-connections are connected together.

8. Apparatus as claimed in claim 1 including an eddy current coupling device, the rotatable shaft of said differential comparison device being connected to the driving element of said eddy current coupling device, said eddy current coupling device having a driven element which is connected to said indicating means, said indicating means having a turnably movable member subjected to a torque applied thereto by said driven element, and means for exerting on said movable member a countertorque which is proportional to a rotational speed of one of said rotary members to be compared.

9. Apparatus as claimed in claim 8 wherein said indicating means includes a rotary coil and wherein means are provided for energizing said rotary coil with direct current corresponding to the angular velocity of one of said rotary members, non-inductively wound conductors being provided for applying said direct current to said rotary coil, a constant magnetic field producing means being arranged for cooperation with said rotary coil, said rotary coil being rotatably mounted in the constant magnetic field produced by said field means, and being responsive to the torque applied thereto by the driven part of said eddy current coupling.

10. Apparatus as claimed in claim 9 wherein said indicating means includes an indicator which is damped by means of fixed electromagnets mounted to influence said driven part of said eddy current coupling proportionally to the driving velocity.

11. Apparatus as claimed in claim 9 wherein for varying the orientation of said constant magnetic field said constant magnetic field producing means is rotatable, whereby the null position of said indicator means is adjustable.

12. Apparatus as claimed in claim 1 wherein said indicating means include a direct current generator having a rotor connected with said rotatable shaft of said differential comparison device and a direct current compensating apparatus conductively connected with the output of said direct current generator, and wherein means are provided for furnishing to said compensating apparatus a compensating voltage which is a direct current proportional to the characteristic of one of the rotary members having characteristics to be compared.

13. Apparatus for measuring a difference in characteristics between at least a first and a second rotary member, comprising, in combination, a first multi-phase alternating current slip-ring generator coupled to said first rotary member and energized electrically by an outside source of alternating voltage of suitable frequency and having output terminals providing a three-phase output voltage the frequency of which is proportional to the characteristic of said first rotary member to be measured; a second multi-phase alternating current slip-ring generator coupled to said second rotary member and conductively connected to said output terminals of said first generator for being electrically energized by said three-phase output voltage, said second generator having output terminals therefore providing a second three-phase output voltage which is proportional to the difference in speed of rotation between said first and second rotary member; a differential comparison device comprising a motor having an alternating current type stator with stator windings and externally accessible input and output terminals respectively connected therewith, the output terminals of said second generator being respectively connected to said input terminals for producing rotary fields in said motor, and said output terminals of said motor being interconnected, said motor including a rotatable shaft capable of being rotated by said rotary fields at a speed of rotation proportioned to any difference between the respective speeds of rotation of said first and second rotary members; and indicating means coupled to said rotatable shaft for indicating the speed of rotation of said rotatable shaft and thereby indicating the difference in characteristics between said first and second rotary members.

References Cited in the file of this patent

UNITED STATES PATENTS

| | | |
|---|---|---|
| 2,039,914 | McBane | May 5, 1936 |
| 2,248,504 | Kenny | July 8, 1941 |
| 2,447,208 | Rendel | Aug. 17, 1948 |

FOREIGN PATENTS

| | | |
|---|---|---|
| 258,455 | Great Britain | Sept. 23, 1926 |